US009790975B2

(12) United States Patent
 Rock (10) Patent No.: US 9,790,975 B2
(45) Date of Patent: Oct. 17, 2017

(54) IN-LINE RAIL AND COMPONENT SYSTEM AND METHOD FOR RAPID COUPLING

(71) Applicant: Artistic Southern, Inc., Alpharetta, GA (US)

(72) Inventor: Roger Rock, Gainesville, GA (US)

(73) Assignee: Artistic Southern, Inc., Alpharetta, GA (US)

( * ) Notice: Subject to any disclaimer, the term of this patent is extended or adjusted under 35 U.S.C. 154(b) by 31 days.

(21) Appl. No.: 14/828,953

(22) Filed: Aug. 18, 2015

(65) Prior Publication Data
US 2016/0115983 A1    Apr. 28, 2016

Related U.S. Application Data

(60) Provisional application No. 62/069,337, filed on Oct. 28, 2014.

(51) Int. Cl.
 *F16B 7/18* (2006.01)
 *F16B 7/04* (2006.01)

(52) U.S. Cl.
 CPC ............ *F16B 7/182* (2013.01); *F16B 7/0413* (2013.01)

(58) Field of Classification Search
 CPC ........ F16B 7/182; F16B 7/0413; F16B 35/04; F16B 37/12; Y10T 403/459; Y10T 403/32467; Y10T 403/32524
 See application file for complete search history.

(56) References Cited

U.S. PATENT DOCUMENTS

| | | | | |
|---|---|---|---|---|
| 1,861,532 A | * | 6/1932 | Hough | G09F 13/26 174/138 H |
| 5,101,213 A | * | 3/1992 | Harada | H01Q 1/088 343/715 |
| 5,282,478 A | * | 2/1994 | Fleischhaker, Jr. | A61M 25/0905 403/229 |
| 5,555,771 A | | 9/1996 | Kuroiwa et al. | |
| 6,039,700 A | * | 3/2000 | Sauter | A61M 25/0905 600/434 |
| 6,971,831 B2 | | 12/2005 | Fattori et al. | |
| 8,348,242 B2 | * | 1/2013 | Rock | E04F 11/1817 256/22 |
| 8,429,805 B1 | | 4/2013 | Adkins | |

(Continued)

FOREIGN PATENT DOCUMENTS

WO    WO 2012/058389 A2    5/2012

OTHER PUBLICATIONS

International Search Report and Written Opinion for PCT/US2015/057033 dated Jan. 29, 2016.

*Primary Examiner* — Daniel Wiley
(74) *Attorney, Agent, or Firm* — Louis Isaf; Womble Carlyle Sandridge & Rice (57) ABSTRACT

Systems and methods for joining together two or more in-line components such as rail (e.g. staircase rail) components or like structures are disclosed herein. The system includes two or more components, each having at least one spring-bolt attached thereto and received in a respective cavity of the components. The components are coupled to one another by interlocking of the spring bolts caused by relative rotation of the spring-bolts, and the components include inner and outer perimeters sized to form a substantially flush connection with no external signs of the coupling mechanism when the components are so coupled.

18 Claims, 8 Drawing Sheets

(56) References Cited

U.S. PATENT DOCUMENTS

| | | |
|---|---|---|
| 8,646,735 B2 | 2/2014 | Bradley |
| 8,870,163 B2 | 10/2014 | Regan |
| 2003/0180123 A1 | 9/2003 | Van Der Heijden |
| 2008/0296549 A1 | 12/2008 | Carney |
| 2009/0134377 A1 | 5/2009 | Petta et al. |
| 2009/0321703 A1 | 12/2009 | Rock |
| 2013/0299761 A1 | 11/2013 | Heiling et al. |
| 2015/0247341 A1 | 9/2015 | Bizzarri et al. |

\* cited by examiner

IN-LINE RAIL AND COMPONENT SYSTEM AND METHOD FOR RAPID COUPLING

CROSS-REFERENCE TO RELATED APPLICATIONS

This application claims the benefit of U.S. Provisional Patent Application No. 62/069,337 filed Oct. 28, 2014.

FIELD OF INVENTION

The present disclosure relates generally to structural systems and methods joining together two or more components such as rail (e.g. staircase rail) components or like structures.

SUMMARY OF THE DISCLOSURE

The present disclosure relates generally to a structural system joining together two or more in-line components such as rail (e.g. staircase rail) components or like structures. The present disclosure also relates generally to a method of coupling components using the system described herein.

INCORPORATION BY REFERENCE

The entire disclosure of U.S. Provisional Patent Application No. 62/069,337, which was filed on Oct. 28, 2014, is hereby incorporated by reference for all purposes as if presented herein in its entirety.

An in-line component assembly is disclosed herein, including at least two rigid, elongated components joined together by an embedded coupling system including a first component at least partly received in an interior cavity of a second component such that adjacent components are at least partially nested, and such that the embedded coupling system becomes out of sight after assembly.

According to a first embodiment, the coupling system is comprised of opposing, mating fasteners mounted within interior cavities of two or more rigid components having end portions that are generally aligned along a longitudinal axis. Each of the rigid, elongated components has at least one mating end to be joined to an adjacent rigid component and each rigid, elongated component is formed with an interior cavity in communication with and accessible through the mating end. According to an embodiment, one of the adjacent, joined-together rigid components is formed with a "male" mating end, and the other with a "female" mating end to facilitate joining, as will be further described below.

According to some embodiments, the system includes a first component having a first outer perimeter extending along a portion of the first component from a ridge disposed at a central portion of the first component towards an edge of the first component, a second outer perimeter extending from the ridge to a mating edge of the first component and defining a mating end of the first component, and an inner perimeter; the second outer perimeter of the first component being smaller than the first outer perimeter of the first component, and the inner perimeter being defined by a cavity extending from the mating edge of the first component to an interior of the first component.

The system also includes a second component having an outer perimeter and an inner perimeter; the inner perimeter being defined by a cavity disposed at a mating end of the second component, the cavity extending from a mating edge of the second component to an interior of the second component.

According to some embodiments, the first outer perimeter of the first component matches or mates with the outer perimeter of the second component such that the first component and second component form a substantially continuous, flush outer joint surface when coupled, and the second outer perimeter of the first component matches or mates with the inner perimeter of the second component such that the mating end of the first component can be inserted into cavity of the mating end of the second component with as little space as desired between the second outer perimeter of the first component and the inner perimeter of the second component.

According to some embodiments, the opposing, mating fasteners are complementary spring-bolts, and one of the complementary spring-bolts (of a pair of complementary spring-bolts) is mounted within the interior cavity of each component. The spring-bolts are aligned so as to be accessible through the mating ends and are adapted to be coupled with another, complementary spring-bolt (of a pair of complementary spring-bolts). The spring-bolts are mounted within the interior cavities of the components with the assistance of mounting structures, each of which may be one of a variety of mounting structure types. For example, according to some embodiments, the mounting structures include one or more wedge couplers (which may be, for example, star-nuts), threaded screws, threaded bolts, nails, or other suitable mounting structures.

According to some embodiments, a first spring-bolt is received in a first cavity in the first component, and the second spring-bolt is received in a second cavity in the second component. However, any number of nested, rigid, elongated components may be joined according to the system disclosed herein, and each may have a cavity at one or more mating ends, and may nest with one or more adjacent components. Embodiments wherein reference is made only to a first and second component are for ease of reference only, and are not intended to limit the number of components that may be joined by the system disclosed herein.

According to some embodiments, the first spring-bolt includes a first spring and a first mounting structure, and the second spring-bolt includes a second spring and a second mounting structure. The first and second springs are each adapted for interlocking when the spring-bolts are adjacently disposed and rotated relative to one another. The first and second mounting structures are adapted for respectively fixing the first spring-bolt to the first component and the second spring-bolt to the second component. Interlocking of the first spring-bolt and second spring-bolt upon relative rotation of the spring-bolts causes the first component and the second component to become coupled.

According to some embodiments, one or more of the component cavities includes a threaded bore disposed at an interior end of the cavity and one or more of the mounting structures comprises a threaded bolt or threaded screw. In such embodiments, one or more fasteners may be mounted to a component by being screwed into one of the threaded bores disposed at the interior end of a cavity.

According to some embodiments, one or more of the mounting structures comprises a wedge coupler adapted to attach to a spring-bolt spring and to fit snugly into a component cavity to keep a spring-bolt in place. One example of a wedge coupler suitable for use with embodiments of the present disclosure is a star-nut. Star-nuts typically include a bolt or screw that attaches to an end of a spring-bolt spring and extends through a star-nut structure having series of wing-shaped protrusions about its periphery, the wing-shaped protrusions being adapted for allowing a spring-bolt to be inserted into a cavity while resisting removal of spring-bolt from the cavity.

According to some embodiments, the first component is coupled to the second component using the following method: A spring-bolt is mounted into a cavity disposed at a mating end of each of the first component and the second component using a mounting structure. The mating end of the first component is inserted at least partially into the cavity at the mating end of the second component so that the first spring-bolt and the second spring-bolt become disposed adjacent one another. The first component and the second component are then rotated relative to one another, causing interlocking of the first spring and the second spring. Once the springs are fully interlocked, the first component extends into the second cavity a distance equal to a length from the mating edge of the first component to the ridge of the first component, such that the ridge is positioned adjacent the mating edge of the second component, forming a substantially continuous, flush outer joint perimeter for the coupled first and second components with no external signs of the coupling mechanism.

DETAILED DESCRIPTION OF THE EXEMPLARY EMBODIMENTS

Although various embodiments are discussed in detail below, it should be appreciated that the description provides numerous inventive concepts that may be embodied in a variety of contexts. The specific aspects and embodiments discussed herein, therefore, are merely illustrative, and do not limit the scope of the invention. Additionally, references to the drawings are for illustrative purposes only and are not meant to limit the scope of the invention.

The in-line component system 10 of the present disclosure generally comprises a plurality of nested components 15, including at least a first component 15a at least partly received in a second component 15b; and a plurality of opposing, mating fasteners 20.

According to some embodiments, the fasteners 20 are complementary spring-bolts 20 and include at least a first spring-bolt 20a fixed to the first component 15a, and a second spring-bolt 20b fixed to the second component 15b. The method of coupling generally comprises fastening a spring-bolt 20 to each of the two or more components 15 and joining the components 15 together by inserting a mating male end 35 of one of the components 15 at least partially inside a mating female end 35 of another component 15 and coupling the spring-bolt 20 of each component 15 to the spring-bolt 20 of another component 15.

Figure 1:
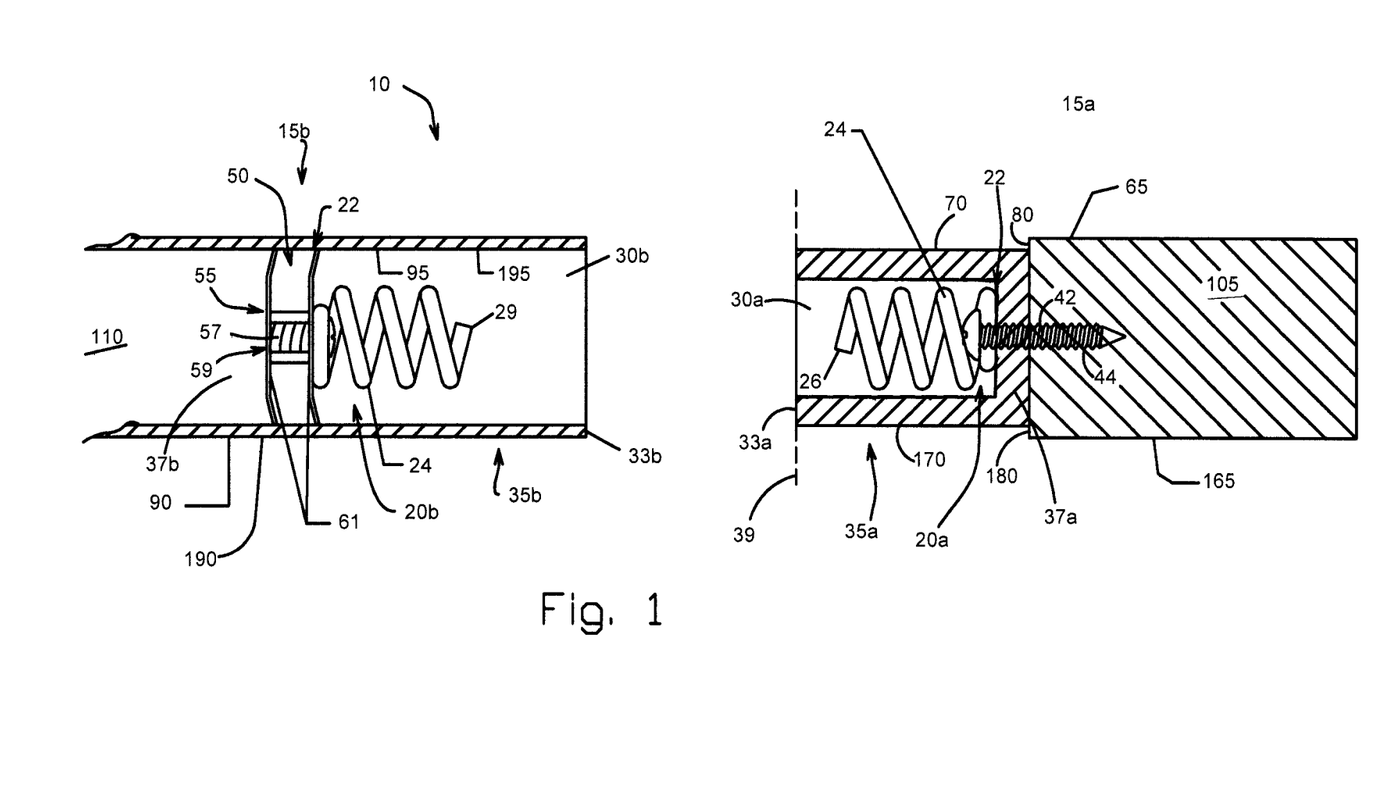
FIG. 1 illustrates embodiments of the present disclosure having a first component that is a fitting and a second component that is a tube.

With reference to FIG. 1, the coupling system 10 disclosed herein comprises one or components 15, each with one or more spring-bolts 20 fixed thereto. Each spring-bolt 20 includes a mounting structure 22 and a spring or coil 24, which may be a helical spring 24. Each mounting structure 22 is configured for fixing a spring-bolt 20 to one of the components 15. Each spring or coil 24 is configured to interlock with the spring or coil 24 of another spring-bolt 20, and is adapted to couple the component 15 to which the spring-bolt 20 is fixed to another component 15 by interlocking action of the springs or coils 24, the interlocking occurring as a result of the components 15 with the spring-bolts 20 fixed thereto being rotated relative to one another. When the system 10 according to some embodiments is used, each component 15 becomes coupled to one or more other components 15 by interlocking of the springs 24.

With reference to FIG. 1, according to some embodiments of this disclosure, the components 15 each include one or more cavities 30 disposed in the component 15. Each cavity 30 extends from a mating edge 33 of a component 15 into an interior 37 of the component 15. A spring-bolt 20 is received in each cavity 30 and is held in place by a spring-bolt mounting structure 22. For a pair of nested components 15 that are joined by the component system 10, at least one of the spring-bolts 20 is fully received within a component cavity 30 such that the spring-bolt 20 does not protrude past a plane 39 defined by a mating edge 33 of the component 15. As will be described in greater detail, this allows for the formation of a substantially flush, outer joint surface for a nested, joined component pair.

Figure 2:
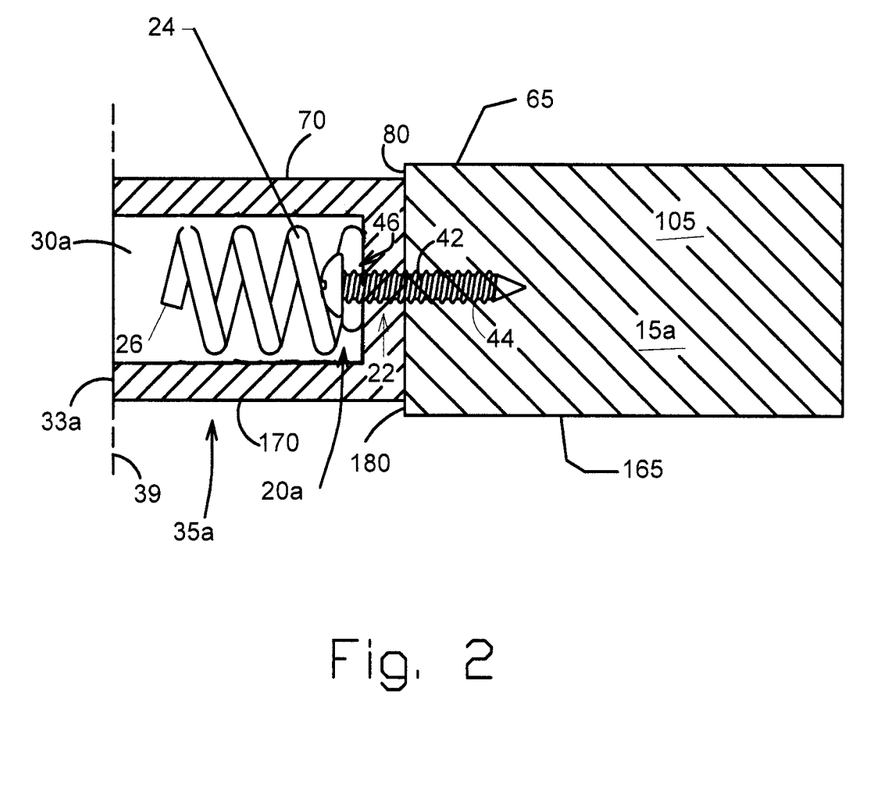
FIG. 2 illustrates embodiments of the present disclosure having a spring-bolt with a threaded screw.

With reference to FIG. 2, and according to some embodiments using, for example, a solid (such as a wooden) component, one or more of the mounting structures 22 is a nail, threaded screw, or threaded bolt 42. In embodiments using a threaded screw or bolt 42, a threaded bore 44 is disposed in each component 15 in which a spring-bolt 20 having a threaded screw or bolt 42 type mounting structure 22 is received, and each screw or bolt 42 is screwed into the one of the threaded bores 44 such that each spring-bolt 20 becomes mounted to a component 15. According to some embodiments, the one or more threaded bores 45 are each disposed at an interior end 46 of a cavity 30, and a spring-bolt 20 is received in each cavity 30 and mounted by being screwed into the threaded bore 44.

Figure 3:
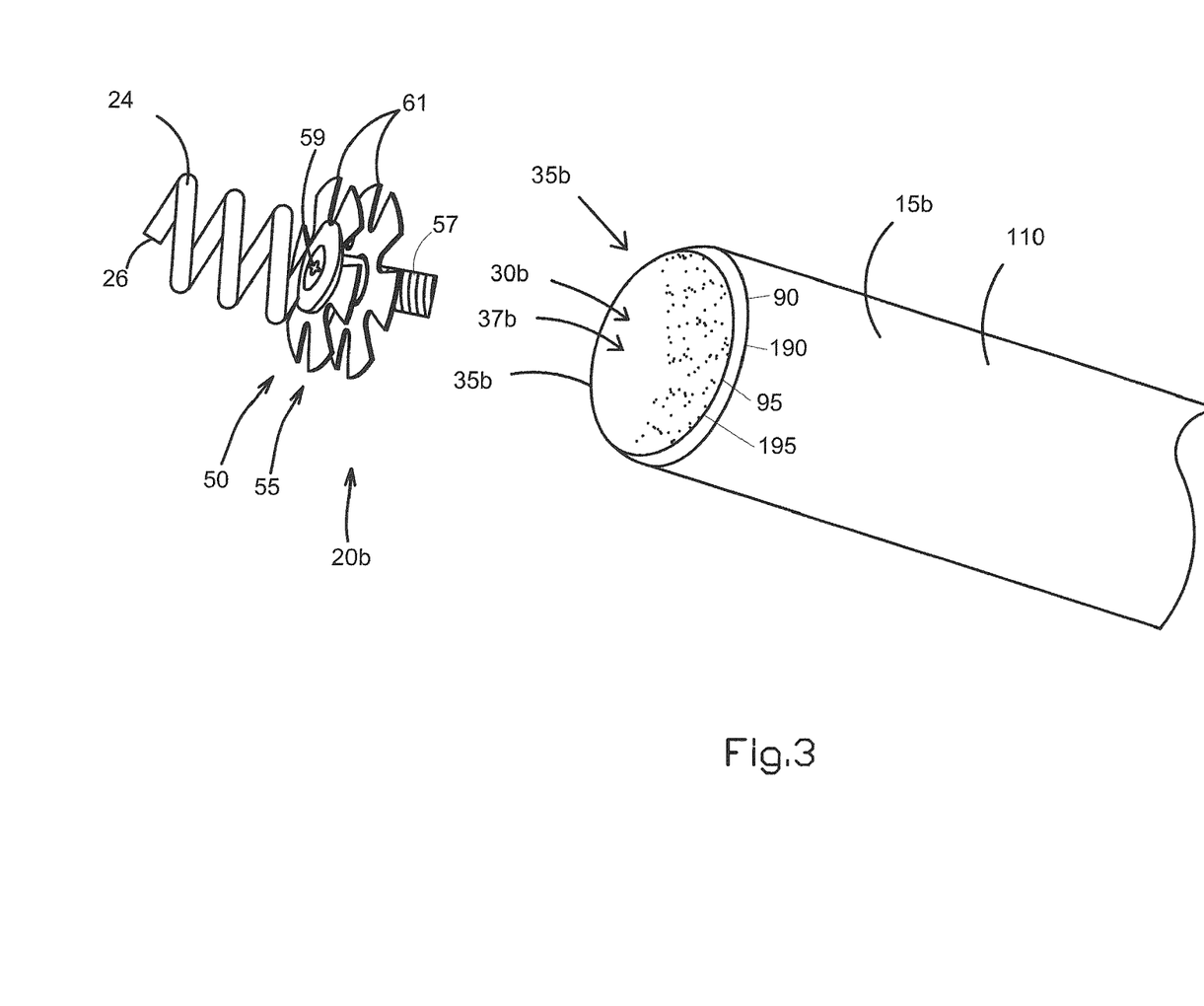
FIG. 3 illustrates embodiments of the present disclosure having a spring-bolt with a wedge coupler that is a star-nut.

With reference to FIG. 3, and according to some embodiments using, for example, a hollow (such as a tubular) component, one or more of the mounting structures 22 comprises a wedge coupler 50. In some embodiments, a screw or bolt 57 extends through a central portion 59 of each wedge coupler 50 and connects the spring-bolt spring 24 to the wedge coupler 50. In some embodiments, each wedge coupler 50 comprises a star-nut 55 that includes one or more series of wing-shaped protrusions 61 about the periphery of the star-nut 55, such that each star-nut 55 is adapted to fit snugly inside a cavity 30. The wing-shaped protrusions 61 are adapted for allowing the spring-bolts 20 to be easily inserted into a cavity 30 while resisting or preventing removal of the spring-bolts 20 from the cavity 30. It will also be apparent that other types of mounting structures, including other types of wedge couplers 50, could alternatively be used without departing from the scope of this disclosure.

Figure 4:
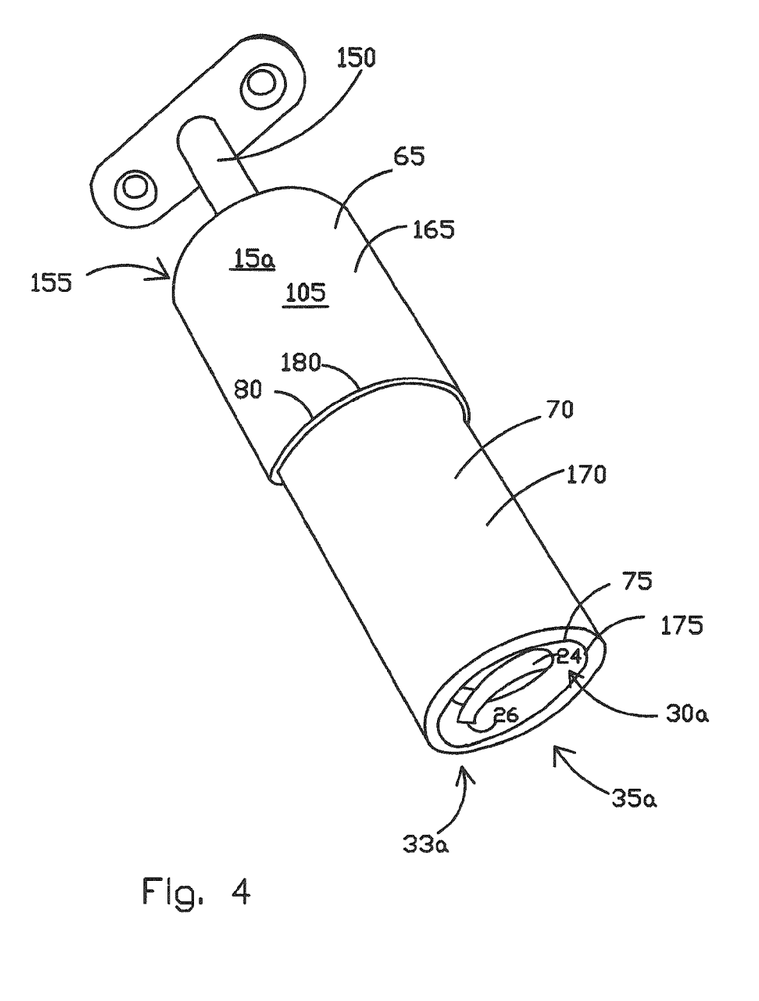
FIG. 4 illustrates a fitting according to some embodiments of the present disclosure, wherein a spring-bolt is fully received and recessed in a cavity of a fitting and wherein a fixture is attached to an end of the fitting disposed opposite the cavity.

With reference to FIG. 4, and according to some embodiments, one or more of the spring-bolts 20 (of a pair of complimentary spring-bolts 20) is mounted within a cavity 30 of a component 15 such that the spring-bolt 20 is fully recessed and is spaced from a plane 39 defined by the mating edge 33 of the component 15. According to some embodiments, the spring-bolt 20 is recessed a distance from the plane 39 that is greater than the distance which any complementary spring-bolt 20 protrudes past the plane 39 of the mating edge 33 of another component 15 (although the pair of complementary spring-bolts may both be recessed, as in FIG. 1). In such embodiments, for the complementary spring-bolts 20 to engage one another, it becomes necessary that a mating end 35 of one of the components 15 be inserted into the mating end 35 of the other of the components 15 at least a distance equal to the difference between the length the recessed spring-bolt 20 is recessed from the plane 39 and the length the protruding spring-bolt 20 protrudes from the plane 39. Otherwise, the springs 24 will not reach each other and will not be suitable for interlocking.

With reference to FIG. 1, and according to some embodiments, the first component 15*a* has a first outer perimeter 65 extending along a portion of the first component 15*a*, a second outer perimeter 70 smaller than the first outer perimeter 65, and an inner perimeter 75 defined by a cavity 30*a* that extends from a mating edge 33*a* of the first component 15*a* into an interior 37*a* of the component 15*a*. A ridge 80 is located in a central portion of the first component 15*a* where the outer perimeter of the first component 15*a* changes from the first outer perimeter 65 to the second outer perimeter 70, such that the second outer perimeter 70 extends from the ridge 80 to a mating edge 33*a* of the first component 15*a* to define a mating end 35*a*, and such that the first outer perimeter 65 extends from the ridge 80 in a direction opposite the mating end 35*a*.

The second component 15*b* has an outer perimeter 90 that matches or mates with the first outer perimeter 65 of the first component 15*a*, and an inner perimeter 95 that matches or mates with the second outer perimeter 70 of the first component 15*a*. The inner perimeter 95 is defined by a cavity 30*b* that extends from a mating edge 33*b* of the second component 15*b* into an interior 37*b* of the second component 15*b* to define a mating end 35*b*.

In some embodiments, the second outer perimeter 70 of the first component 15*a* substantially matches or mates with the inner perimeter 95 of the second component 15*b* such that the first component 15*a* can be inserted at least partially into the second component cavity 30*b* with little to no space (with tolerance) between the second outer perimeter 70 of the first component 15*a* and the inner perimeter 95 of the second component 15*b*. The first and second components 15*a*, 15*b* are then rotated relative to one another, causing the spring-bolts 20*a*, 20*b* to interlock, and causing the first and second component 15*a*, 15*b* to be further pulled together. Once the spring-bolts 20*a*, 20*b* are fully interlocked and the first and second components 15*a*, 15*b* are pulled completely together, the mating edge 33*b* of the second component 15*b* will be adjacent to the ridge 80, causing a substantially continuous, flush outer joint surface with no external signs of the coupling mechanism.

Figure 5:
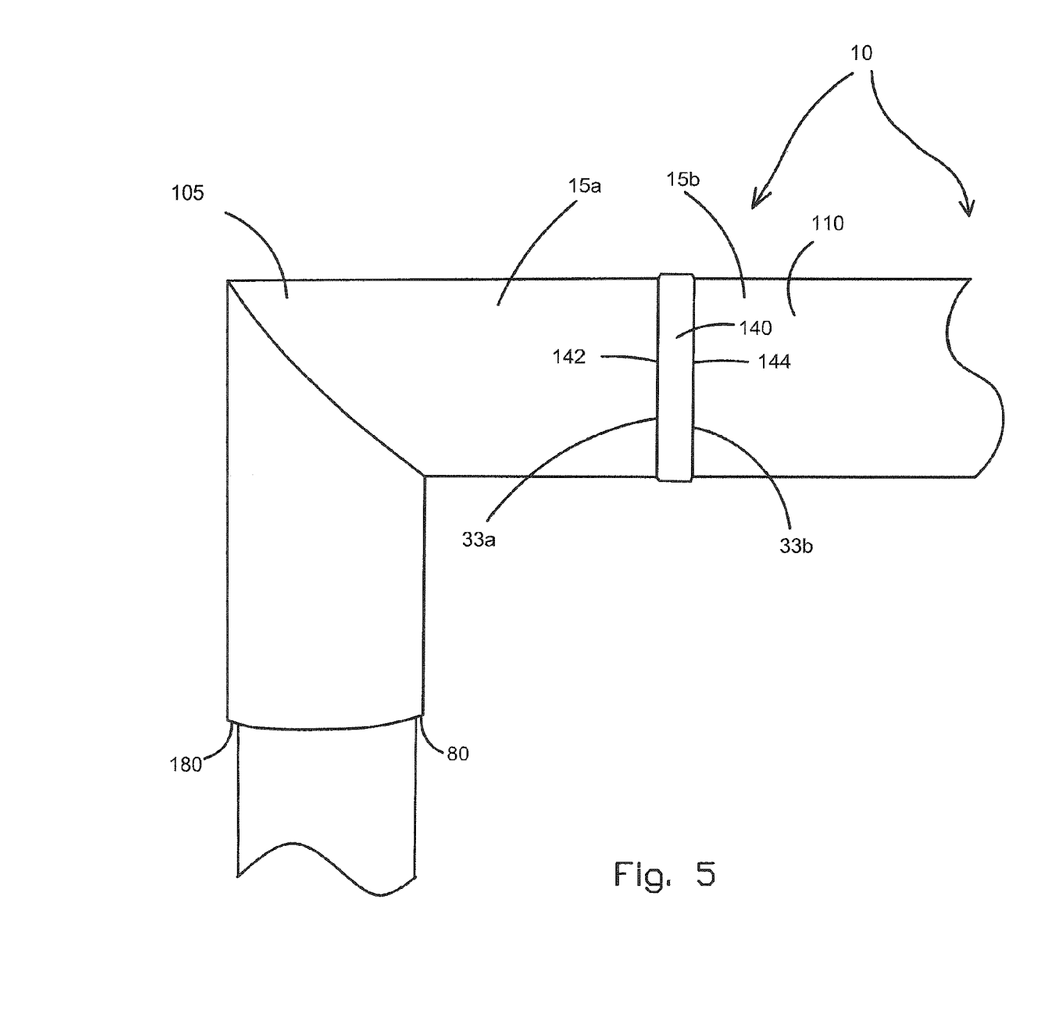
FIG. 5 illustrates embodiments of the present disclosure and shows a first component having a bend joined to a second component with a ring or washer positioned at the connection.

With reference to FIG. 1, in some embodiments of the present disclosure, the first component 15*a* is a fitting 105, and the second component 15*b* is a tube 110. Such fittings 105 and tubes 110 are generally cylindrical and therefore capable of mating to form a substantially flush, outer joint surface, however, it will be understood that other shapes and configurations for the fitting 105 or tube 110 may also be suitable for use without departing from the scope of this disclosure. For example, the fitting 105 or tube 110 may be curved or may include a bend or corner (as shown in FIG. 5). Also, the fitting 105 and tube 110 may be a generally rectangular or triangular prism or other suitable shape instead of a cylinder without departing from the scope of this disclosure. Additionally, the cavities 30 and mating ends 35 may be non-cylindrical without departing from the scope of this disclosure. So long as a male mating end of a component 15 can be inserted into a female mating end 15 of another component and the two components can be rotated relative to one another, two components of any shape can be joined. When the fitting 105 and tube 110 are the same shape, the fitting 105 and tube 110 may be coupled such that their outer surfaces mate to form a substantially continuous, flush outer joint surface with no external signs of the coupling mechanism, such as two elongated rectangular prisms forming a continuous outer surface. However, it will be apparent that non-congruous shapes for the fitting 105 and tube 110 may be used in applications where a substantially continuous, flush outer joint surface is not needed or desired.

Figure 6:
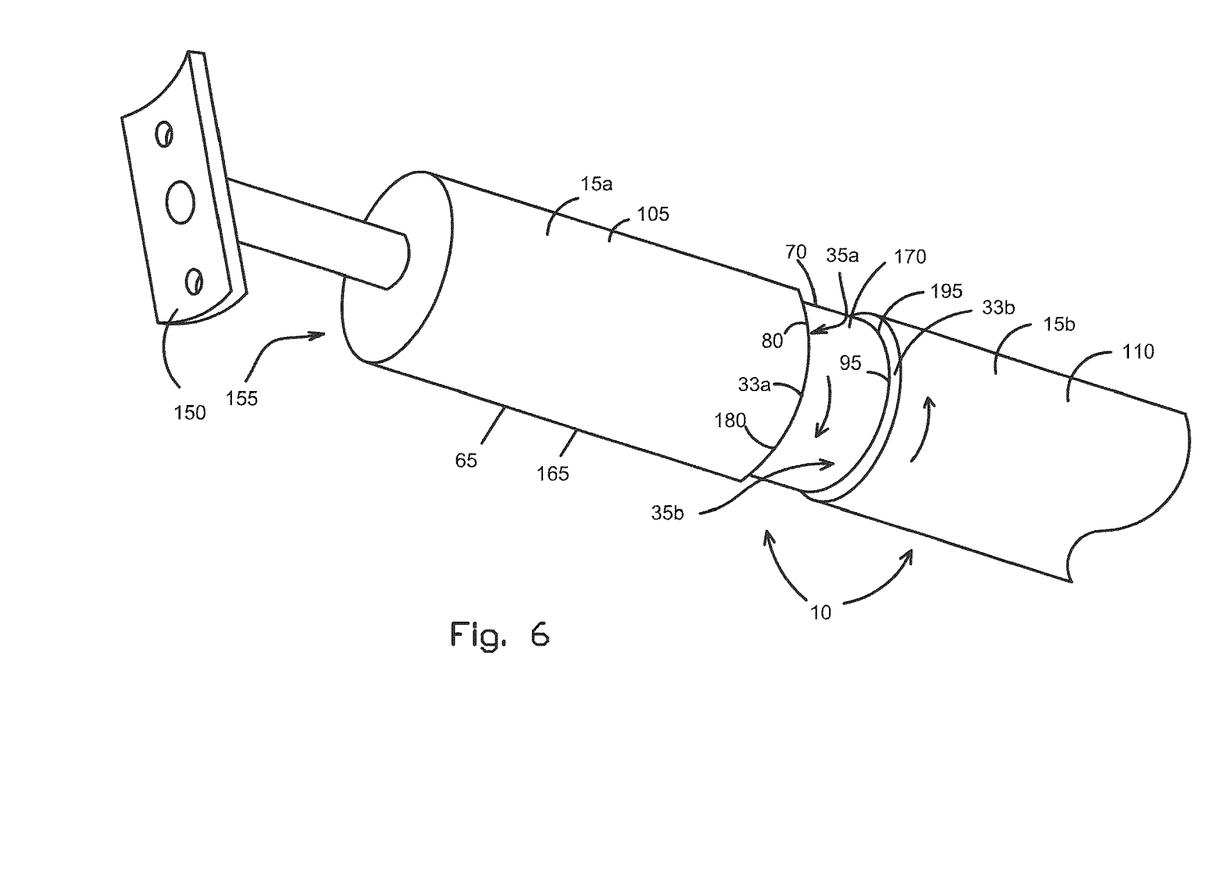
FIG. 6 illustrates embodiments of the present disclosure having a first component received in a cavity of a second component.
Figure 7:
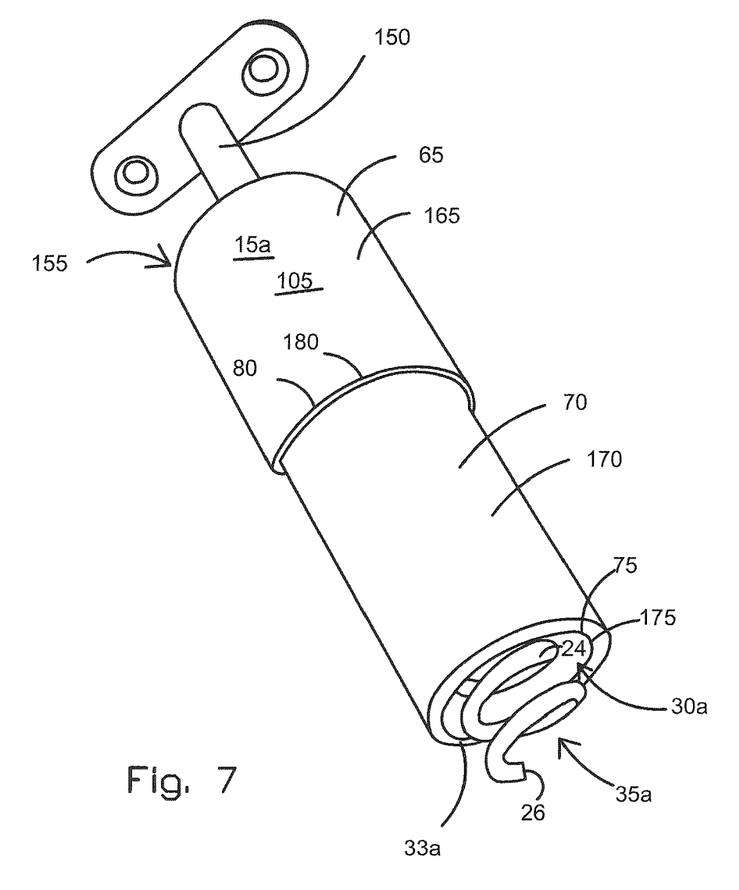
FIG. 7 illustrates embodiments of the present disclosure with a spring-bolt received in and partially protruding from a cavity of a fitting.

In some embodiments, and with reference to FIG. 6, the first component 15*a* is a cylindrical fitting 105 made of wood that has been shaved down so the fitting 105 has a first outer circumference 165, a second outer circumference 170 at one or more mating ends 35*a*, the second circumference 170 being smaller than the first circumference 165, and one or more ridges 180 disposed in a central portion of the fitting 105 where the circumference changes from the first circumference 165 to the second circumference 170. As shown in FIG. 1, at least one cavity 30*a* is disposed in the fitting 105, and each cavity extends from each mating edge 33*a* to an interior 37*a* of the fitting 105 and defines an inner circumference 175. A first spring-bolt 20*a* is received at least partially inside each cavity 30*a* and is fixed to the fitting 105 using a mounting structure 22 as previously described. In some embodiments, a fixture 150 may be attached to a fixture end 155 of the fitting 105. It will further be appreciated that the fitting 105 does not necessarily have to be wooden, and may instead be similarly constructed from any other suitable material.

According to some embodiments, the second component 15*b* is a metal tube 110 having an outer circumference 190 and one or more cavities 30*b*, each cavity 30*b* extending from a mating edge 33*b* of the tube 110 to an interior 37*b* of the tube 110 and defining a mating end 35*b*. An inner circumference 195 is defined by each cavity 30*b*, and a spring-bolt 20*b* is received at least partially inside each cavity 30*b* and is fixed to the tube 110 using a mounting structure 22 as previously described. It will further be appreciated that the tube 110 does not necessarily have to be metal, and may instead be similarly constructed from any other suitable material.

According to some embodiments, and as shown in FIG. 1, when the coupling system 10 is used, a spring-bolt 20 is inserted into and mounted within a mating end 35*a* of the fitting 105 and a mating end 35*b* of the tube 110. The fitting 105 is inserted into the cavity 30b at the mating end 33b of the tube 110 such that the first spring-bolt 20a and the second spring-bolt 20b become disposed adjacent to one another. The fitting 105 and tube 110 are rotated relative to one another to engage and interlock the spring-bolts 20a, 20b. Once interlocked, the fitting 105 will be inserted into the tube 110 a distance equal to the length of the portion of the fitting 105 having the second outer circumference 170, such that the mating edge 35b is disposed adjacent the ridge 180, and such that the fitting 105 and tube 110 become joined with little to no space (with tolerance) between the second outer circumference 170 of the fitting 105 and the inner circumference 195 of the tube 110, thus forming a substantially continuous, flush, outer joint surface with no external signs of the coupling mechanism.

According to some embodiments, and as shown in FIG. 5, a ring or washer 140 is disposed around the portion of the fitting 105 having the second outer circumference 170 with a first end 142 of the ring or washer 140 being disposed adjacent the ridge 180. When the fitting 105 is inserted into and coupled to the tube 110 by the interlocking of the spring-bolts 20a, 20b as previously described, a second end 144 of the ring or washer 140 will be disposed adjacent the mating edge 35b of the tube 110 in which the fitting 105 is inserted, forming a substantially continuous, flush outer joint surface with no external signs of the coupling mechanism.

As shown by FIG. 1, one embodiment of the present disclosure may be used as follows: Attach a helical spring 24 to a threaded screw 42 to form a spring-bolt 20a, and mount the spring-bolt 20a inside a cavity 30a at a mating end 33a of a fitting 105 such that the screw 42 is screwed into a threaded bore 44 located at the interior end 37a of the cavity 30a. Attach a helical spring 24 to a wedge coupler 50 using a bolt 57 to form a spring-bolt 20b, and mount the spring-bolt 20b inside a cavity 30b at a mating end 33b of a metal tube 110. Then, insert the mating end 33a of the wooden fitting 105 into the cavity 30b at the mating end 33b of the metal tube so that the spring-bolts 20a, 20b are disposed adjacent one-another. Twist the wooden fitting 105 and tube 110 relative to one another to engage the helical springs 24, thus coupling the fitting 105 and tube 110 and tightening the connecting joint to form a substantially flush, outer joint surface with no external signs of the spring-bolts 20a, 20b or mounting structures 22.

Figure 8:
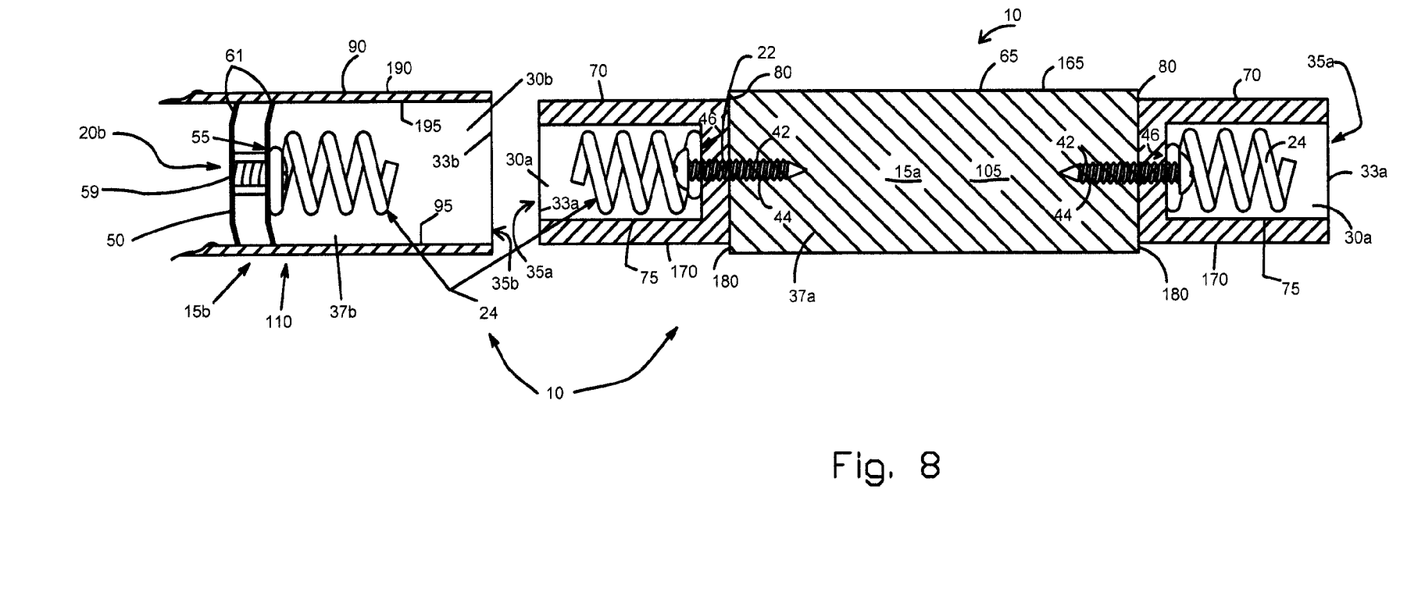
FIG. 8 illustrates embodiments of the present disclosure having a first component with two mating male ends and a second component with a female mating end in which a mating male end may be received.
Figure 9:
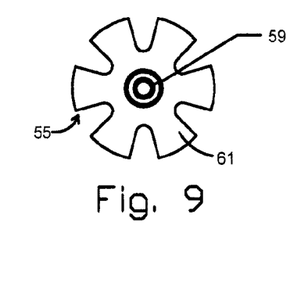
FIG. 9 is an orthogonal view of a fastener of FIG. 8 according to some embodiments.
Figure 10:
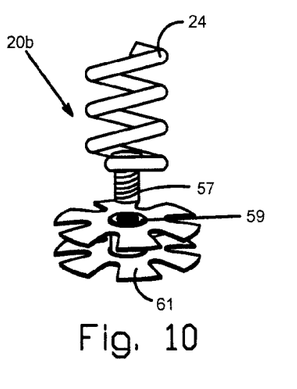
FIG. 10 is a perspective view of a fastener of FIG. 8 according to some embodiments.

According to some embodiments, and as shown in FIG. 8, one or more spring-bolts 20 may be received inside a cavity 30 of a component 15 such that a portion of the spring or coil 24 protrudes from the cavity. In other embodiments, such as shown in FIG. 1 and FIG. 4, each spring-bolt 20 is received entirely or is recessed within a cavity 30.

Although some embodiments of this disclosure have been described in terms of a first component 15a and a second component 15b or a fitting 105 and a tube 110 each respectively having a first spring-bolt 20a and second spring-bolt 20b, it will be apparent that the inventive concepts contained herein are not limited to only two nested components 15 each having only one spring-bolt 20. Rather, a component 15 could have a spring-bolt 20 received in a cavity 30 at multiple mating ends 35, such as a component 15 having a spring-bolt 20 at two ends (FIG. 8), a cross-shaped component 15 having a spring-bolt 20 disposed at all four ends, or any other suitable configuration. Further, it will be apparent that any number of components 15 can be joined together using the system described herein, each component 15 being coupled to one or more other components 15 using fasteners 20 received in cavities 30 as described herein, and it will be further apparent that any number of nested components 15 may each be configured to have inner and outer perimeters defining male ends and female ends configured for insertion of one or more male ends into one or more respective female ends to form substantially continuous, flush outer joint surfaces with no external signs of the coupling mechanism.

It will also be apparent that each component 15 is not necessarily limited in the number or relative sizes of inner or outer perimeters or ridges. For example, a first component 15 may be joined at one end to a second component 15 having an outer perimeter and at another end to a third component 15 having an outer perimeter different from the outer perimeter of the second component 15. Each component 15 may have outer and inner perimeters adapted for insertion into another component 15 with little to no space (with tolerance) between outer and inner perimeters of the nested components 15, and each component 15 may have outer perimeters and ridges adapted to form a substantially continuous, flush outer joint surface when adjacent, nested components 15 are coupled.

When the components 15 are coupled by interlocking a pair of complementary spring-bolts 20 through relative rotation in one direction, the components 15 will become fixed to one another. However, relative rotation in the opposite direction decouples the components 15 from one another. In some applications, it may be desirable that the fixing of the components 15 be more permanent. For such applications, glue or another adhesive may be applied to one or more of the spring-bolts 20 to cause a more permanent fixing. It may also be desirable that adhesive be applied in a pre-determined strength or amount such that the components 15 are securely fixed, but such that striking the coupled components 15 using a pre-determined amount of force breaks the adhesive and allows the components to be decoupled, such that coupling of the components 15 is semi-permanent.

It can be seen, therefore, that this disclosure relates to a component system 10, as discussed above; and also relates to a method for coupling components 15, which is characterized by the nesting of components 15 and the safe, efficient manner of joining that results in a substantially continuous, flush outer joint surface and that leaves no external sign of coupling elements.

The foregoing description illustrates and describes various embodiments. As various changes could be made in the above constructions without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments that are within the scope of the claims.

Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A component assembly system, comprising:
    at least two components, including a first component and a second component,
        the first component having a male end, a first outer perimeter, a second outer perimeter, and an inner perimeter, the second outer perimeter of the first component being smaller than the first outer perimeter of the first component, and the inner perimeter of the first component being defined by a first cavity extending from the male end of the first component to an interior of the first component, and
        the second component having an outer perimeter and an inner perimeter; the second component inner perimeter being defined by a second cavity extending from a first end of the second component to an interior of the second component, the first outer perimeter of the first component being adapted for mating with the outer perimeter of the second component, and the second outer perimeter of the first component being adapted for mating with the inner perimeter of the second component such that the male end of the first component can be inserted into the second component to form a substantially flush, outer joint surface with little or no space between the second outer perimeter of the first component and the inner perimeter of the second component;
    at least two fasteners, including a first fastener attached to the first component and a second fastener attached to the second component wherein
    the first fastener and second fastener are adapted for mutual engagement and for joining the first component to the second component when the male end is inserted into the second cavity and the first and second component are rotated relative to one another.

2. The system of claim 1, wherein the first fastener is received in the first cavity and the second fastener is received in the second cavity.

3. The system of claim 2, wherein one or more of the at least two fasteners is positioned entirely within one or more respective cavities of the at least two components.

4. The system of claim 2, wherein one or more of the at least two fasteners is positioned partly within a respective cavity of the at least two components with at least a part of the fastener protruding from the respective cavity.

5. The system of claim 1, wherein each of said at least two fasteners comprises a spring-bolt having a spring, and wherein the first component is coupled to the second component by relative rotation causing interlocking of the springs of said spring-bolts.

6. The system of claim 1, wherein one of more of the at least two fasteners includes a threaded screw or bolt, and wherein said one or more of the at least two fasteners is fixed to a respective component by being screwed into a threaded bore of the component.

7. The system of claim 1, wherein the second outer perimeter of the first component extends from a mating end of the first component to a ridge disposed at a central portion of the first component, and the first outer perimeter of the first component extends from the ridge towards an end of the first component opposite the mating end.

8. The system of claim 1, wherein the at least two components are rigid, elongated components aligned along a common longitudinal axis.

9. A component assembly system, comprising:
    at least two components, including a first component having a male end and a second component having a cavity;
    at least two fasteners, including a first fastener attached to the first component and a second fastener attached to the second component,
    wherein
        the first fastener and second fastener are adapted for mutual engagement and for joining the first component to the second component when the male end is inserted into the cavity and the first and second component are rotated relative to one another,
        one or more of the at least two fasteners includes a wedge coupler and is fixed to a respective component at least partially by said wedge coupler, and
        one or more wedge couplers are a star-nut having one or more sets of protrusions about a periphery of the star-nut.

10. A component assembly system, comprising:
    at least two components, including at least a first component and a second component; each component having an interior cavity disposed at one or more ends of the component;
    at least two fasteners, each fastener being fixed to a respective component of the at least two components, and each fastener being positioned in a respective interior cavity of the at least two components; wherein
    the first component has a first outer perimeter, a second outer perimeter, and an inner perimeter, the second outer perimeter of the first component being smaller than the first outer perimeter of the first component, and the inner perimeter being defined by a first cavity extending from the second end of the first component to an interior of the first component;
    the second component has an outer perimeter and an inner perimeter; the second component inner perimeter being defined by a second cavity extending from a first end of the second component to an interior of the second component, the first outer perimeter of the first component being adapted for mating with the outer perimeter of the second component, and the second outer perimeter of the first component being adapted for mating with the inner perimeter of the second component such that the second end of the first component can be inserted into the second component to form a substantially flush outer surface and with little or no space between the second outer perimeter of the first component and the inner perimeter of the second component.

11. The system of claim 10, wherein the second outer perimeter of the first component extends from a mating end of the first component to a ridge disposed at a central portion of the first component, and the first outer perimeter of the first component extends from the ridge to an end of the first component opposite the mating end.

12. The system of claim 10, wherein each of said at least two fasteners comprises a spring-bolt having a spring, and wherein the first component is coupled to the second component by relative rotation causing interlocking of the springs of said spring-bolts.

13. The system of claim 10, wherein one or more of the at least two fasteners includes a wedge coupler, and wherein said one or more of the at least two fasteners is fixed to a respective component at least partially by wedging action of said wedge coupler.

14. The system of claim 13, wherein one or more wedge couplers comprise a star-nut having one or more sets of protrusions about a periphery of the star-nut and a bolt received through a central portion of the star-nut.

15. The system of claim 13, wherein one or more of the at least two fasteners comprises a threaded screw or bolt, and wherein said one or more of the at least two fasteners is fixed to a respective component by being screwed into a threaded bore of the component.

16. The system of claim 13, wherein one or more of the at least two fasteners is positioned entirely within a respective cavity of the at least two components.

17. The system of claim 10, wherein the at least two components are rigid, elongated components aligned along a common longitudinal axis.

18. A method of coupling two or more components; the method comprising: obtaining at least two components, including a first component and a second component, the first component having a male end, a first cavity at the male end, a first outer perimeter, a second outer perimeter, and an inner perimeter, the second outer perimeter of the first component being smaller than the first outer perimeter of the first component, and the inner perimeter being defined by the first cavity and extending from the male end of the first component to an interior of the first component, the second component having an outer perimeter and an inner perimeter; the second component inner perimeter being defined by a second cavity extending from a first end of the second component to an interior of the second component, the first outer perimeter of the first component being adapted for mating with the outer perimeter of the second component, and the second outer perimeter of the first component being adapted for mating with the inner perimeter of the second component such that the male end of the first component can be inserted into the second component to form a substantially flush outer surface with little or no space between the second outer perimeter of the first component and the inner perimeter of the second component;

at least two fasteners, including a first fastener mountable in the first cavity and a second fastener mountable in the second cavity, wherein the first fastener and second fastener are adapted for mutual engagement and for joining the first component to the second component when the male end is inserted into the second cavity and the first and second component are rotated relative to one another, and following the steps of:

attaching the first fastener to the first component;
attaching the second fastener to the second component;
inserting the male end of the first component into the second cavity; and
rotating the first component and second component relative to one another to engage the fasteners.

* * * * *